United States Patent [19]

Davis et al.

[11] Patent Number: 5,014,496
[45] Date of Patent: May 14, 1991

[54] METHOD OF AND APPARATUS FOR CONTINUOUS BAKERY PRODUCT WRAPPING

[75] Inventors: Bill E. Davis, Irving; Eugene W. Myers, Allen; Richard B. Goodhart, Plano; William M. Paris, Highland Village; James T. Borthwick, Jr., Dallas, all of Tex.

[73] Assignee: Stewart Systems, Inc., Plano, Tex.

[21] Appl. No.: 408,103

[22] Filed: Sep. 15, 1989

[51] Int. Cl.$^5$ .................... B65B 31/04; B65B 9/02
[52] U.S. Cl. ...................... 53/433; 53/443; 53/350; 53/511; 53/546; 53/553
[58] Field of Search ............... 53/450, 553, 555, 546, 53/511, 510, 512, 433, 432, 434

[56] References Cited

U.S. PATENT DOCUMENTS

| | | | |
|---|---|---|---|
| 3,355,857 | 12/1967 | Tobey | 53/553 X |
| 3,508,378 | 4/1970 | Fehr et al. | 53/553 |
| 3,752,295 | 8/1973 | Hubbell et al. | 198/34 |
| 3,760,553 | 9/1973 | Schmidt, Sr. et al. | 53/450 |
| 3,888,066 | 6/1975 | Tabur | 53/511 X |
| 3,995,407 | 12/1976 | Segale et al. | 53/511 |
| 4,299,075 | 11/1981 | Gram | 53/546 X |
| 4,601,159 | 7/1986 | Mugnai | 53/511 |

Primary Examiner—James F. Coan
Attorney, Agent, or Firm—Michael A. O'Neil

[57] ABSTRACT

An apparatus for continuous bakery products includes a carriage having opposed sealing jaws. Upper and lower webs of wrapping material extend between the jaws of the carriage along a bakery product path. Bakery products to be wrapped are advanced along the bakery product path between the webs of wrapping material and between the initially open jaws of the carriage. The jaws of the carriage are then closed to form transverse seals at the trailing edge of a leading package of bakery products and at the leading edge of a trailing package of bakery products. The carriage is advanced along the bakery product path during the sealing operation so that sealing of the bakery product packages is carried out on a continuous basis. The apparatus for continuous wrapping of bakery products further includes an infeed conveyor having guides for crowding the bakery products into a packaging configuration, a discharge conveyor, apparatus for sealing the lateral edges of the bakery product packages, and apparatus for evacuating air from the bakery product packages.

29 Claims, 11 Drawing Sheets

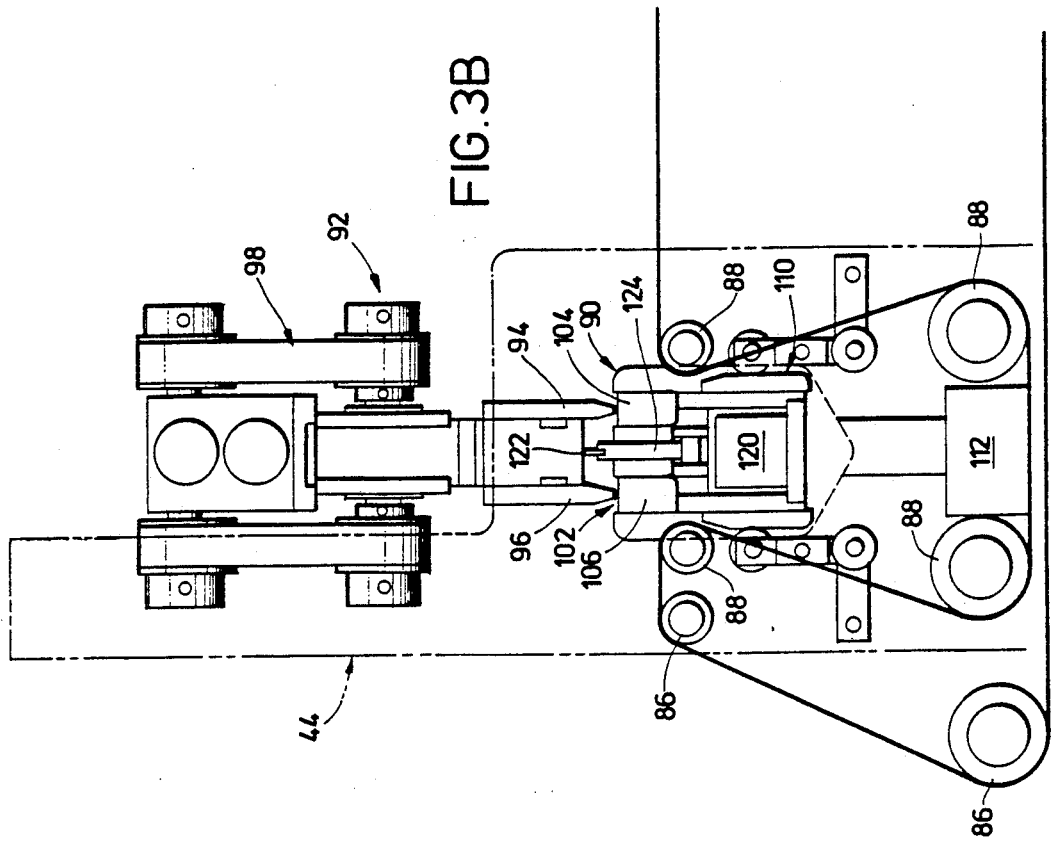
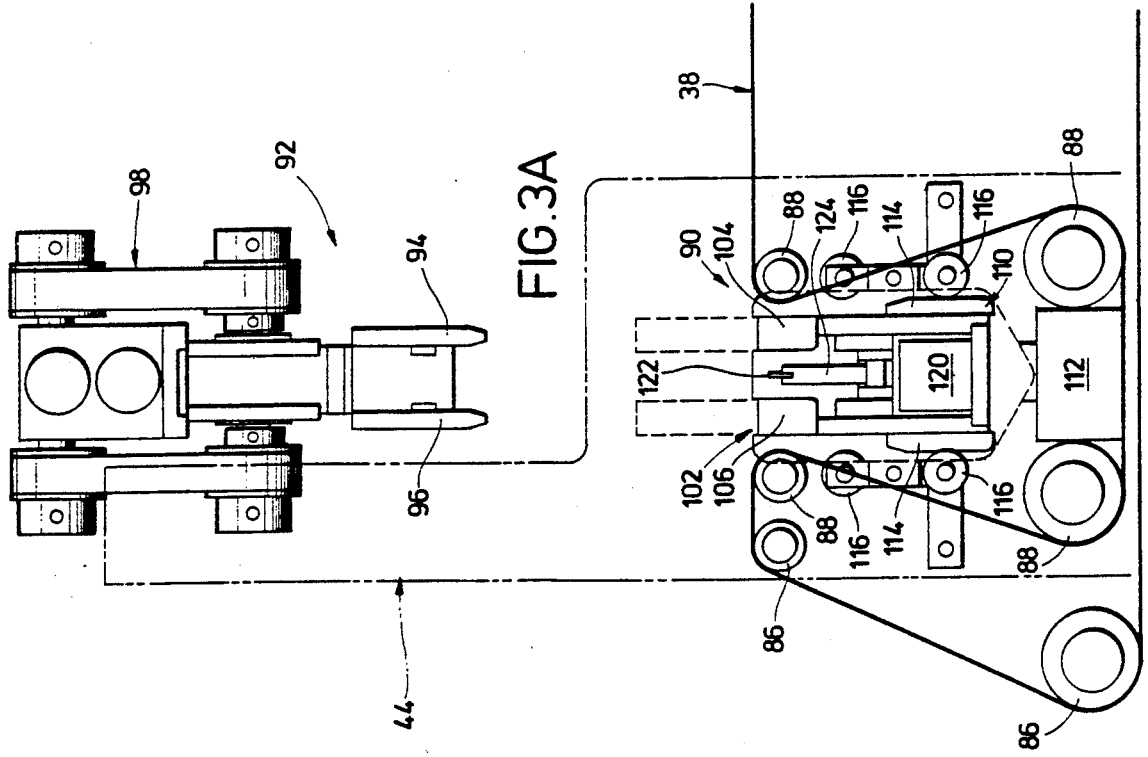

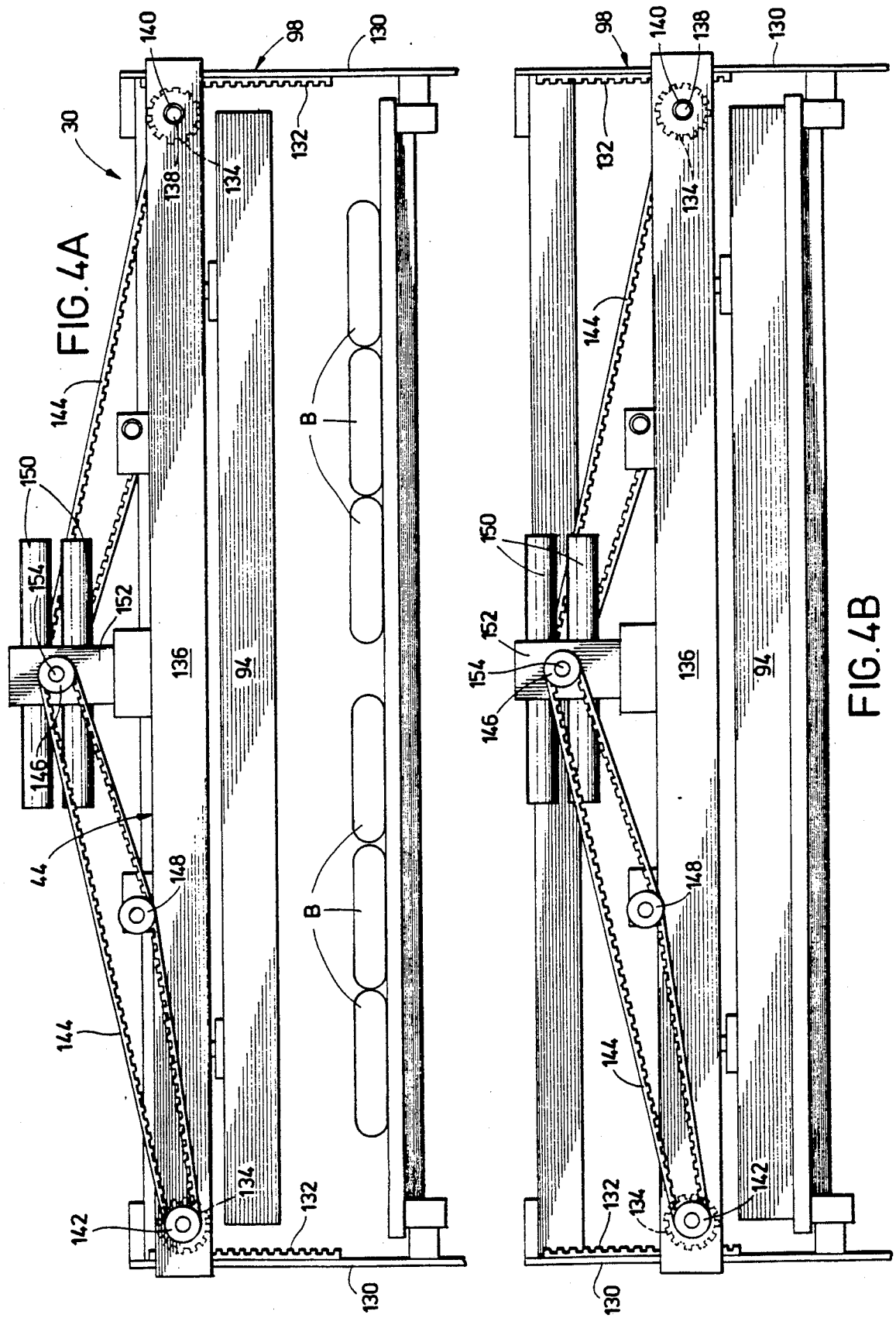

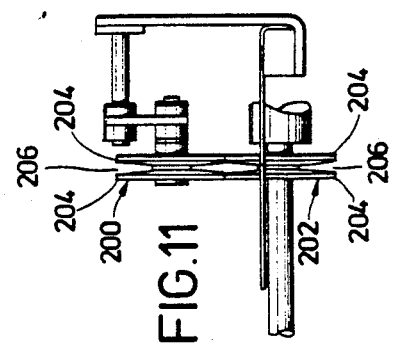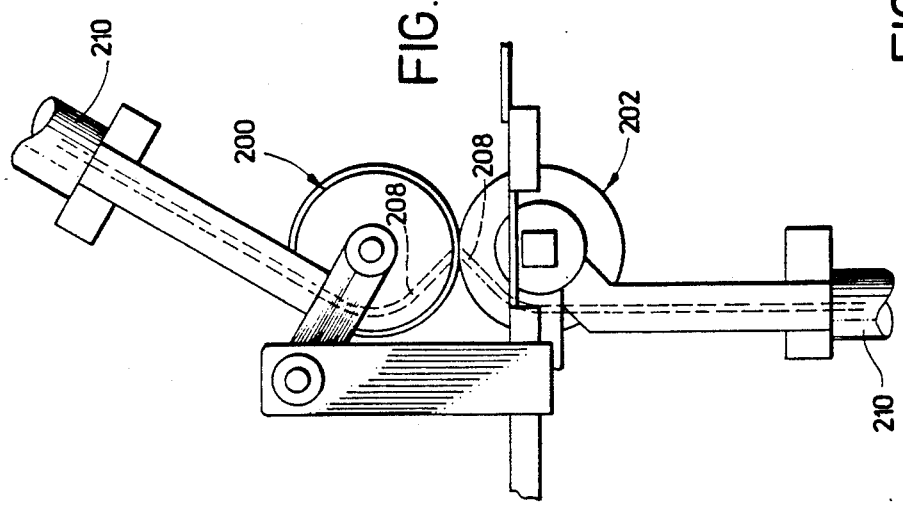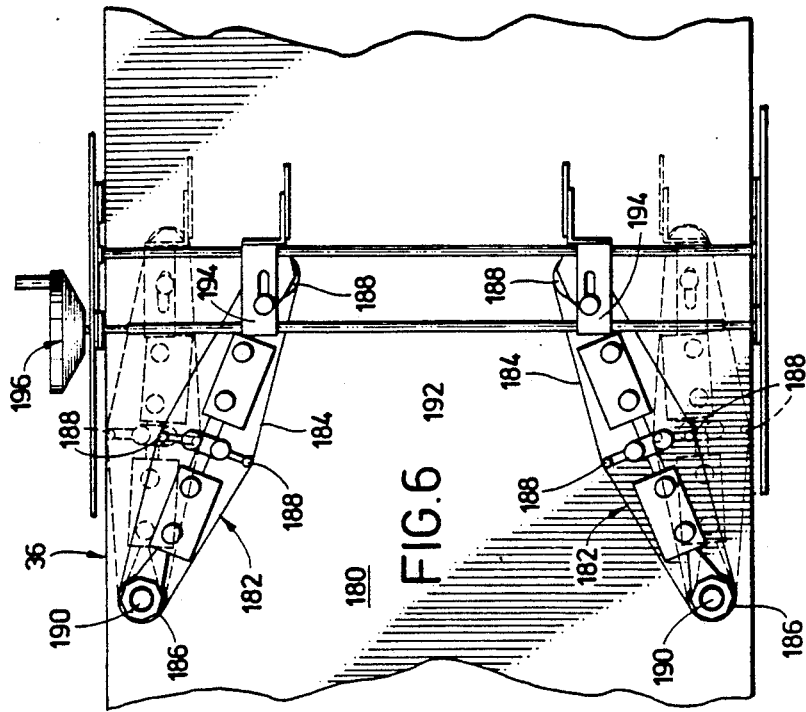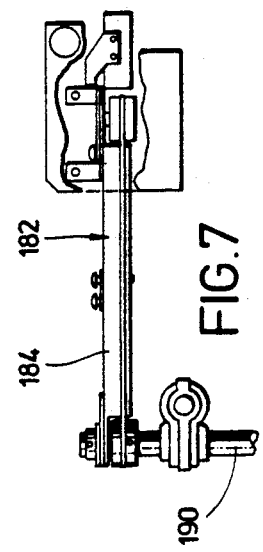

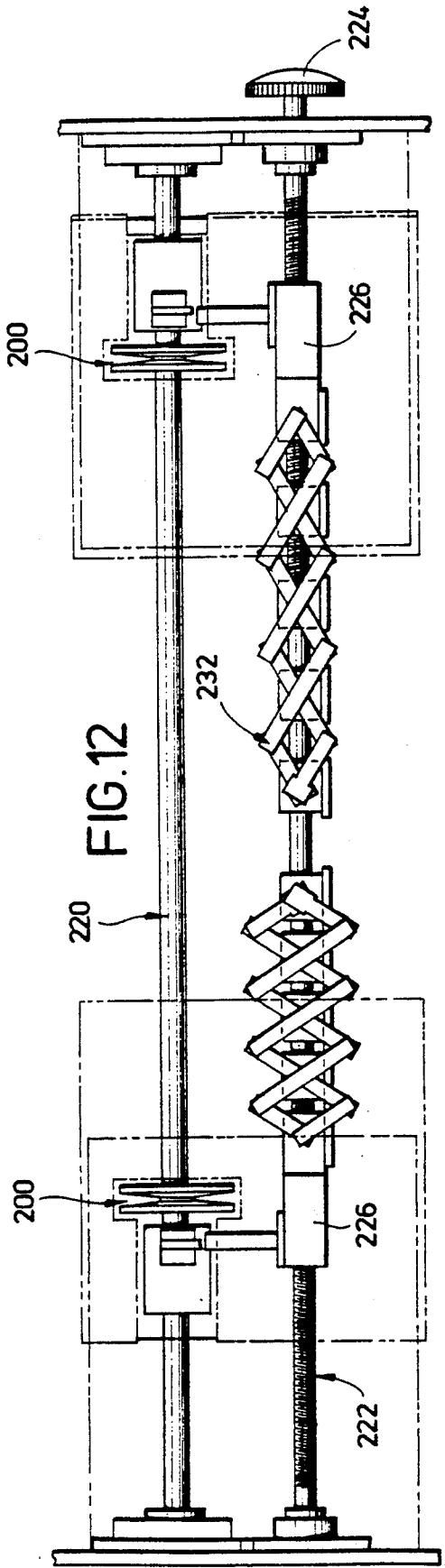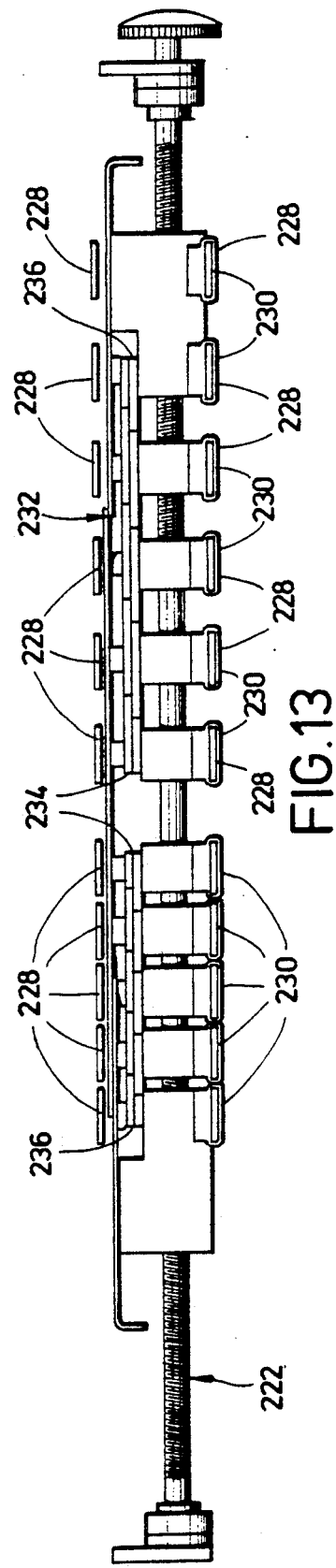

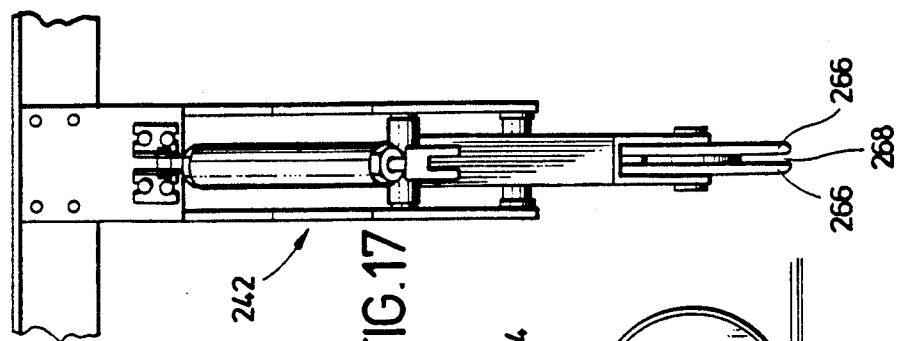
FIG. 17
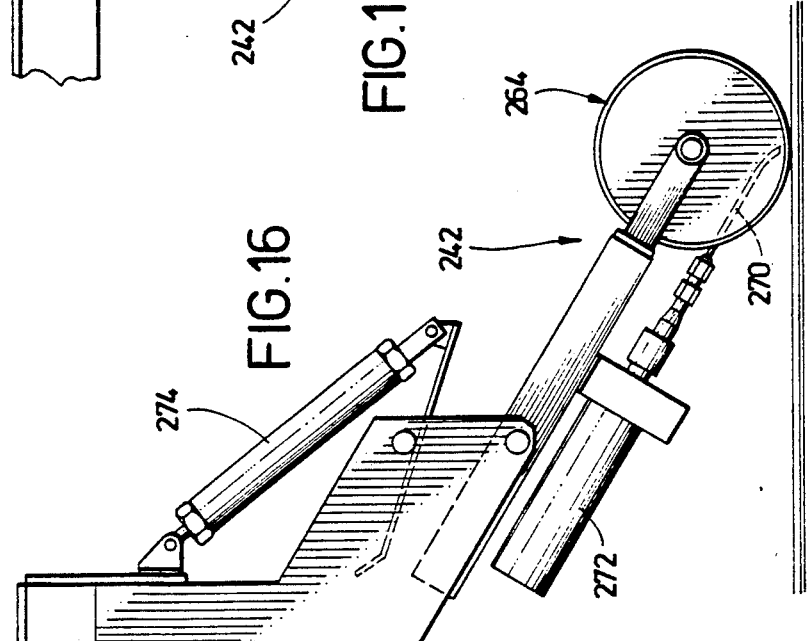
FIG. 16
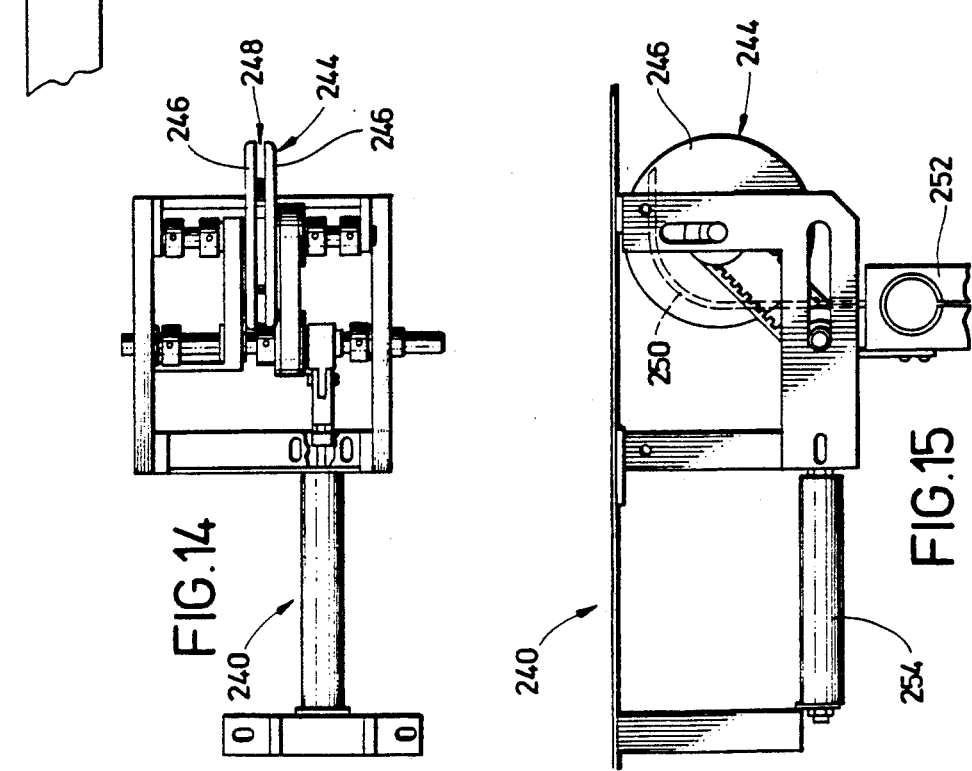
FIG. 14
FIG. 15

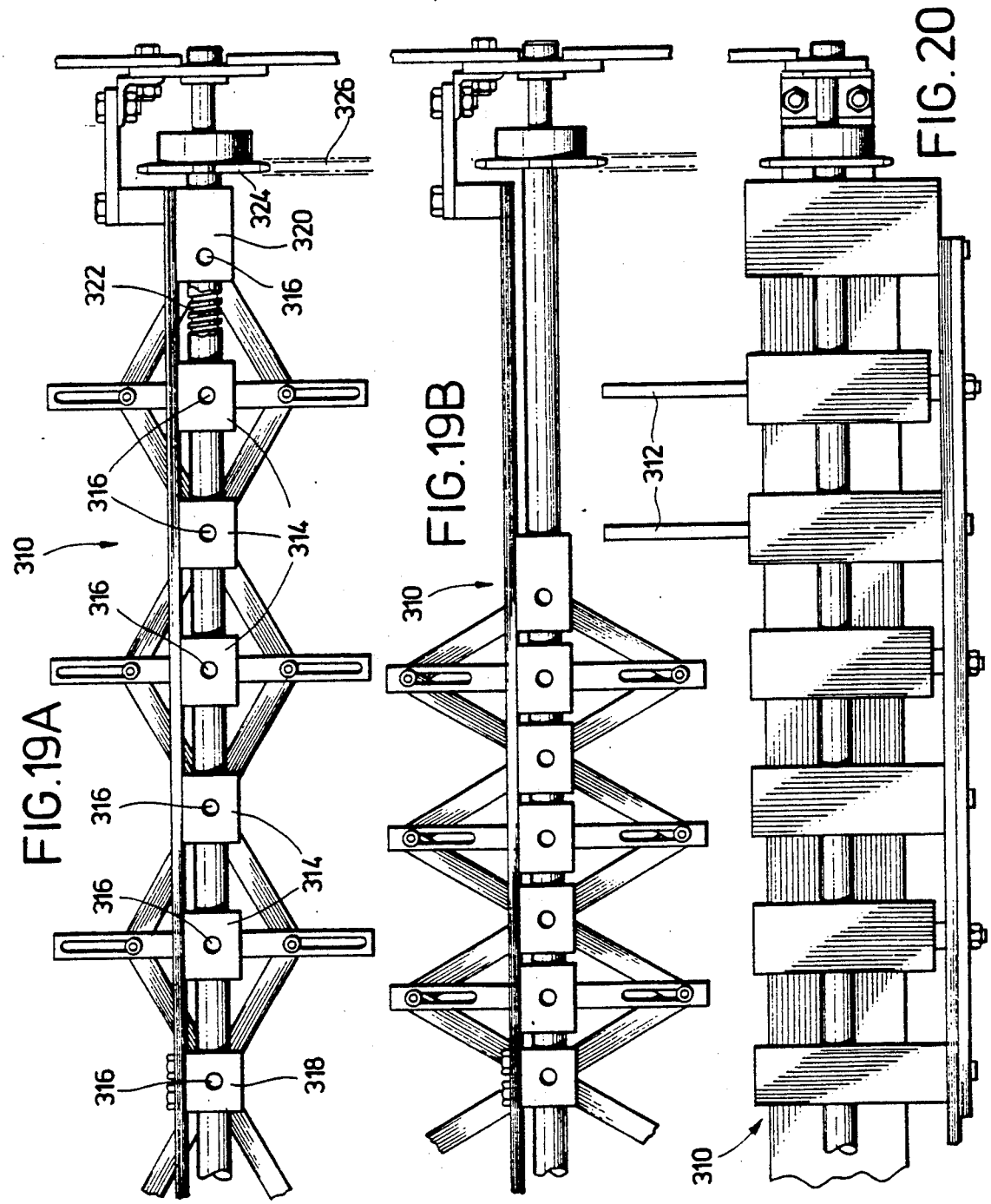

METHOD OF AND APPARATUS FOR CONTINUOUS BAKERY PRODUCT WRAPPING

TECHNICAL FIELD

This invention relates generally to the wrapping of bakery products in an automated bakery, and more particularly to a method of and apparatus for continuously wrapping bakery products characterized by uninterrupted movement of the bakery products through a bakery product path wherein the bakery products are received between upper and lower layers of wrapping material, the wrapping material is sealed in a transverse direction between groups of bakery products, excess air is removed from the thus formed product packages, lateral seals are formed to close the product packages, and an optional center seal is effected in the product package.

BACKGROUND OF THE INVENTION

As is well known in the baking industry, bakery products such as hamburger buns, rolls, and similar bakery products are almost universally packaged in polyethylene wrapping material to protect the bakery products against staleness, contamination, and tampering.

In an automated commercial bakery, bakery products are baked and aligned into columns for movement through a slicing machine. The sliced products are then gathered into groups of 6 or 12, depending upon the desired package size, and wrapped in polyethylene wrapping material. Heretofore, various devices, such as those described in U.S. Pat. No. 3,355,857 and U.S. Pat. No. 3,760,553 have been provided for wrapping bakery products with polyethylene wrapping materials.

One of the drawbacks to the typical prior art design for apparatus of this type involves the fact that polyethylene has a relatively high melting point, thereby requiring the application of heat for a relatively long period of time to melt the polyethylene sufficiently to effect a seal between the various sheets of the material comprising the bakery product package. For this reason, the prior art wrapping apparatus have required that the products being packaged remain in a stationary position during the sealing operation. Such requirement is detrimental in that it results in intermittent movement of the bakery product during the sealing operation, thereby slowing the packaging process. Thus, the overall process of slicing the bakery products, assembling the bakery products into groups for packaging, and packaging the bakery products is slowed down by the fact that the transverse sealing step has heretofore been stationary.

An additional drawback to typical prior art design for apparatus of this type involves the fact that the completed bakery product package contains excess air allowing shifting and separating of the bakery products upon leaving the product line of the commercial bakery.

SUMMARY OF THE INVENTION

The present invention overcomes the foregoing and other problems long since associated with the prior art by providing an apparatus for wrapping the bakery products and sealing the polyethylene wrapping material on a continuous basis. In accordance with the broader aspects of the invention, a sealing mechanism is characterized by upper and lower jaws which are initially separated sufficiently to allow the bakery product group to be packaged to pass therethrough. Through the open jaws are passed upper and lower lengths of polyethylene wrapping material between which bakery product groups are fed under the action of the infeed conveyor.

After a bakery product group has passed through the open jaws, the jaws are closed to effect dual transverse seals, one comprising the seal for the trailing edge of a leading package of bakery products and the second comprising the seal for the leading edge of a trailing package of bakery products. The jaws are mounted on a carriage which travels on ways to allow the jaws to move with bakery product package along the bakery product path during the sealing process, such that the movement of the bakery product package is continuous during the sealing process. After transverse sealing has been completed, a cutting band disposed between the two jaws is activated to separate the leading package from the trailing package, after which the jaws are opened and retracted. Thus, the requirement that the bakery product package remain stationary during the sealing process is omitted, increasing the rate of packaging, and thereby alleviating the slowdown in slicing and grouping the bakery products for packaging.

After the transverse seals have been effected, the bakery product packages continue movement along the bakery product path for sealing of the lateral edges of the packages. The lateral edges of the product package pass through two opposed pairs of upper and lower wheels as hot air is directed between wheels to melt the polyethylene wrapping material, thereby effecting the lateral seals as the bakery product package continues uninterrupted movement along the bakery product path. Vacuum vents are inserted into the product package and activated to remove excess air in the package simultaneously with the completion of the lateral seals. Thus, the packaging material fits snugly around the bakery products to reduce damage thereto as a result of shifting of the bakery products once the product package leaves the product line of the bakery.

An optional longitudinal center seal may be accomplished by activating centrally disposed upper and lower wheels to engage and move the polyethylene wrapping material in the center of the product package as hot air is directed between the wheels, melting the polyethylene material to effect the longitudinal center seal. The longitudinal center seal is effected simultaneously with the lateral seals of the product package and removal of the excess air within the product package, as the bakery product package continues uninterrupted movement along the bakery product path. Thus, the bakery products are wrapped at a faster rate in a package providing improved support to prevent shifting of the bakery products after the package leaves the product line of the bakery. Other advantages deriving from the use of the invention will readily suggest themselves to those skilled in the art.

DESCRIPTION OF THE DRAWINGS

A more complete understanding of the invention may be had by reference to the following Detailed Description when taken in conjunction with the accompanying Drawings, wherein:

FIG. 3A is a side view of the carriage of the apparatus of FIG. 1 showing the sealing and severing mechanism thereof in the open condition;

FIG. 3B is an illustration similar to FIG. 3A showing the sealing and severing mechanism of the carriage in the closed condition;

FIG. 4A is a front view of the carriage illustrated in FIGS. 3A and 3B showing the sealing and severing mechanism thereof in the open condition;

FIG. 4B is an illustration similar to FIG. 4A showing the sealing and severing mechanism in the closed condition;

FIG. 6 is a partial top view of the infeed conveyor illustrated in FIG. 5 showing the construction and positioning of the guide mechanism thereof;

FIG. 7 is a partial end view of the guide mechanism of FIG. 6;

FIG. 10 is an enlargement of part of the mechanism shown in FIG. 9 illustrating the lateral package edge sealing mechanism of the apparatus of FIG. 1;

FIG. 11 is an enlargement of part of the mechanism shown in FIG. 8 further illustrating the package edge sealing mechanism of the apparatus of FIG. 1;

FIG. 12 is a partial top view of the mechanism of FIG. 8 illustrating apparatus for positioning the mechanism which forms the lateral seals of bakery product packages in accordance with the package size and illustrating a mechanism for positioning the discharge conveyor components of the apparatus of FIG. 1;

FIG. 13 is a partial front view further illustrating the apparatus of FIG. 12;

FIG. 14 is a partial side view of a mechanism that may be used in conjunction with the apparatus of FIG. 1 to form a center seal for bakery product packages and illustrating the part of the mechanism used to form such a seal along the bottom surface of such a package;

FIG. 15 is a partial top view further illustrating the apparatus of FIG. 14;

FIG. 16 is a partial side view of the mechanism for forming a center seal along the upper surface of the bakery product package;

FIG. 17 is a partial front view further illustrating the apparatus of FIG. 16;

FIG. 19A is a partial top view of a mechanism for positioning bakery product guides to align bakery products for movement through a slicing machine prior to the receipt of the bakery products by the infeed conveyor of the apparatus of FIG. 1;

FIG. 19B is an illustration similar to FIG. 19A showing the mechanism in a collapsed condition; and FIG. 20 is a partial front view of the apparatus of FIGS. 19A and 19B.

DETAILED DESCRIPTION

Figure 1:
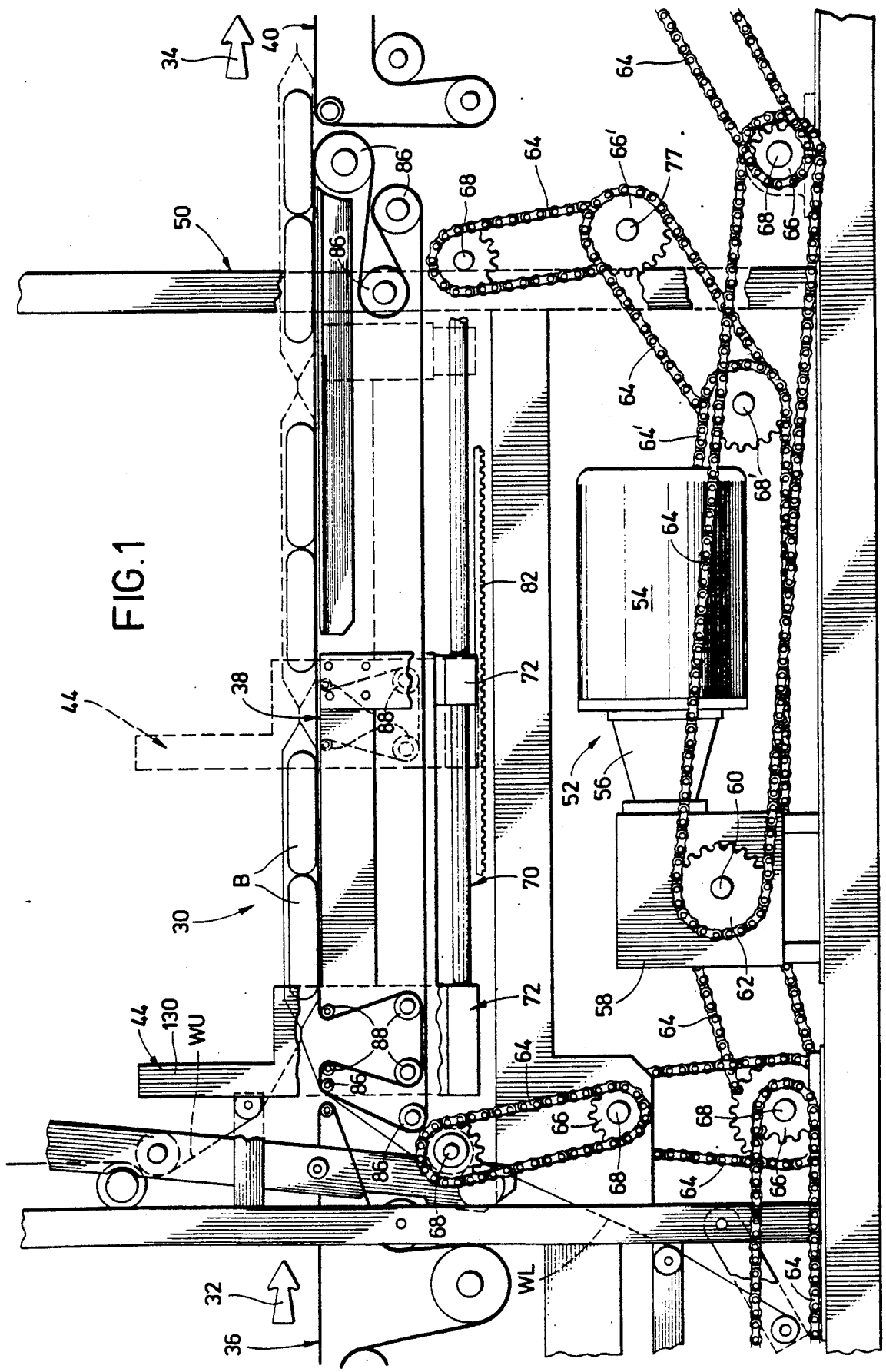
FIG. 1 is a partial side view of an apparatus for continuous bakery product wrapping incorporating the invention in which certain parts have been broken away more clearly to illustrate certain features of the invention.

Referring now to the Drawings, and particularly to FIG. 1 thereof, there is shown an apparatus for continuous bakery product wrapping 30 incorporating the preferred embodiment of the present invention. The apparatus 30 defines a bakery product path illustrated in part by the arrows 32 and 34 and comprising an infeed conveyor 36, a bakery product wrapping conveyor 38, and a discharge conveyor 40.

In the operation of the apparatus 30, bakery products such as hamburger buns B are received on the apparatus 30 on the infeed conveyor 36 and are directed thereby into a throat defined by an upper web of wrapping material WU and a lower web of wrapping material WL. The webs of wrapping material WU and WL extend through a carriage 44 which includes apparatus for partially melting the webs of wrapping material WU and WL to form transverse seals at the trailing edge of a leading bakery product package and at the leading edge of a trailing bakery product package, and to thereafter sever the webs of wrapping material WU and WL to form discrete bakery product packages.

The bakery products are initially directed into the apparatus 30 with the sealing and severing mechanism of the carriage 44 in an open condition and with the carriage 44 positioned at the extreme left end (FIG. 1) of its path of travel. After the bakery products have been received between the webs of wrapping material WU and WL and have passed through the carriage 44, the sealing and severing mechanism thereof is closed and the carriage 44 is caused to move rightwardly (FIG. 1) as the transverse seals at the trailing edge and at the leading edge of adjacent packages of bakery products are formed. When the seals have been formed, and with the carriage 44 continuing its rightward movement (FIG. 1), the severing mechanism of the carriage 44 is actuated to separate the adjacent packages.

The sealing and severing mechanism of the carriage is then opened and the carriage is returned to the position illustrated in full lines in FIG. 1. The partially completed and severed packages of bakery products continue to travel rightwardly (FIG. 1) along the bakery product path under the action of the product wrapping conveyor 38 and the discharge conveyor 40.

Figure 2:
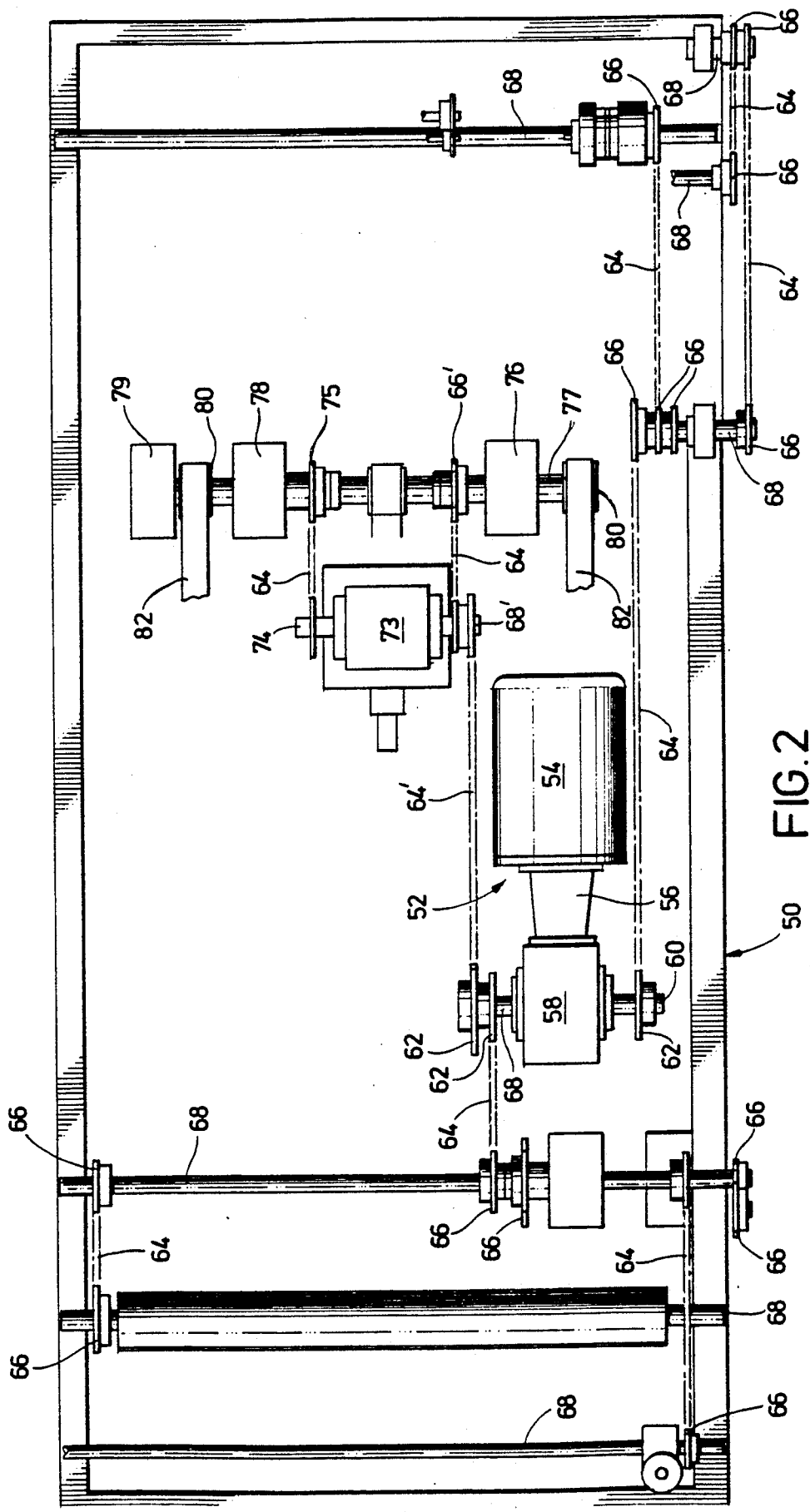
FIG. 2 is a partial top view of the apparatus of FIG. 1 illustrating the drive mechanism thereof.

Referring simultaneously to FIGS. 1 and 2, the apparatus for continuous bakery product wrapping 30 includes a frame 50 which may be of any conventional construction. Preferably, however, the component parts of the frame 50 are formed from a material such as stainless steel since the apparatus 30 is intended for use in conjunction with food products. Thus, the frame 50 is preferably comprised of stainless steel components of various conventional cross-sectional configurations which are joined together by conventional techniques.

The apparatus 30 further comprises a drive mechanism 52 which supplies operating power to all of the component parts thereof. The drive mechanism 52 includes a motor 54 mounted on the frame 50. The motor 54 preferably comprises a constant speed electric motor. However, other conventional motor types such as hydraulic motors, pneumatic motors, etc. may be utilized in the operation of the apparatus 30, if desired.

The motor 54 has an output 56 which drives a speed reducer 58 mounted on the frame 50. The speed reducer 58 has output shafts 60 extending from the opposite sides thereof. Drive sprockets 62 are mounted on the output shafts 60 of the speed reducer 58.

Roller chains 64 direct operating power from the drive sprockets 62 to the various operating instrumentalities of the apparatus 30. Thus, the roller chains 64 drive driven sprockets 66 which in turn actuate drive shafts 68. In the preferred embodiment of the invention, a single motor 54 is utilized to actuate the speed reducer 58 which in turn operates through the drive sprockets 62, the roller chains 64, the driven sprockets 66 and the drive shafts 68 to operate all of the component parts of the apparatus 30.

Referring again particularly to FIG. 1, the carriage 44 of the apparatus for continuous bakery product wrapping 30 is supported for movement between a left-hand limit (FIG. 1) wherein the carriage 44 is illustrated in full lines and a right-hand limit (FIG. 1) wherein the carriage 44 is illustrated in broken lines. The carriage 44 is supported for movement between its limit of travel on stainless steel ways 70 which are in turn supported on the frame 50 of the apparatus 30. Antifriction bearing members 72 support the carriage 44 for movement along the ways 70.

The positioning mechanism for the carriage 44 is further illustrated in FIG. 2. A roller chain 64' rotates a drive shaft 68' in the forward direction, thereby rotating a sprocket 66' in the forward direction. The drive shaft 68' also actuates a gear box 73 having an output shaft 74 which rotates in the reverse direction. The gear box 73 thereby causes a sprocket 75 to rotate in the reverse direction.

A clutch 76 selectively connects the sprocket 66' to a drive shaft 77, thereby causing the drive shaft 77 to rotate in the forward direction. A clutch 78 selectively connects the sprocket 75 to the shaft 77, thereby causing the shaft 77 to rotate in the reverse direction. A brake 79 is selectively operable to lock carriage 44 in the position shown in full lines in FIG. 1.

The shaft 77 drives a pair of sprockets 80 which in turn drive a pair of timing belts 82. As is best shown in FIG. 1, the timing belts 82 are connected to the carriage 44. Thus, the mechanism illustrated in FIG. 2 is selectively operable to lock the carriage in the position shown in full lines in FIG. 1, to advance the carriage 44 in the forward direction, i.e., rightwardly in FIG. 1 until the carriage 44 reaches the limit of its travel as illustrated in broken lines in FIG. 1, or to move the carriage in the reverse direction, i.e., leftwardly in FIG. 1 until the carriage arrives back at its starting position as illustrated in full lines in FIG. 1.

The bakery product wrapping conveyor 38 comprises a web of fabric extending laterally across the entire width of the apparatus 30. The conveyor 38 comprises a conveyor course defined by rollers 86 mounted on the frame 50 of the apparatus 30 and rollers 88 mounted on the carriage 44. The bakery product path of the apparatus 30 as partially defined by the arrows 32 and 34 includes a gap 90 on the carriage 44 which is provided to allow the sealing and severing mechanism of the carriage 44 to engage the webs of product wrapping material WU and WL. Because the rollers 88 defining part of the course of the conveyor 38 are mounted on the carriage 44, the gap 90 is always positioned in accordance with the positioning of the carriage 44.

The carriage 44 of the apparatus for continuous bakery product wrapping 30 and the sealing and severing mechanism thereof are shown in greater detail in FIG. 3A wherein the sealing and severing mechanism is shown in the open condition and in FIG. 3B wherein the sealing and severing mechanism is shown in the closed condition. The sealing and severing mechanism of the carriage 44 includes an upper portion 92 positioned directly above the gap 90 of the course of the bakery product wrapping conveyor 38. The upper portion 92 of the sealing and severing mechanism includes a forward elongate heated bar 94 adapted to form a transverse seal at the trailing edge of a leading package of bakery products and a rearward elongate heated bar 96 adapted to form a transverse seal at the leading edge of a trailing package of bakery products positioned immediately adjacent to and behind the leading bakery product package. The bars 94 and 96 are preferably heated by conventional means, such as electric resistance heating elements mounted within the bars 94 and 96. The upper portion 92 of the sealing and severing mechanism of the carriage 44 further includes an apparatus 98 for selectively raising and lowering the heated bars 94 and 96.

The sealing and severing mechanism of the carriage 44 also includes a lower portion 102 mounted within the gap 90 of the course of the bakery product wrapping conveyor 38. The lower portion 102 of the sealing and severing mechanism includes elongate rubber members 104 and 106 positioned in alignment with and directly beneath the elongate heated bars 94 and 96 of the upper portion 92, respectively. The elongate heated bars 94 and 96 and the corresponding elongate rubber members 104 and 106 form defined jaws which effect sealing of the trailing edge of a leading package of bakery products and the leading edge of a trailing package of bakery products, respectively.

As will be appreciated by those skilled in the art, the webs of wrapping material WU and WL typically comprise lengths of plastic sheeting material. For example, polyethylene is typically employed in the bakery industry for the wrapping of bakery products. The temperature at which the elongate heated bars 94 and 96 is maintained, and the pressure applied between the jaws comprising the elongate heated bars 94 and 96 and the corresponding elongate rubber members 104 and 106 are selected in accordance with the material comprising the webs of bakery product wrapping material WU and WL so as to effect a seal therebetween.

The lower portion 102 of the sealing and severing apparatus of the carriage 44 includes a subcarriage 110 having the elongate rubber members 104 and 106 mounted thereon. Pneumatic cylinders 112 are adapted to raise and lower the subcarriage 110 thereby moving the elongate rubber members 104 and 106 between extreme limits of travel as illustrated in full lines and in broken lines in FIG. 3A. The subcarriage 110 includes guide members 114 which cooperate with guide rollers 116 mounted on the carriage 44 to regulate the upward and downward movement of the subcarriage 110 under the action of the pneumatic cylinders 112.

In the operation of the apparatus for continuous bakery product wrapping 30, the elongate heated bars 94 and 96 are positioned either in the raised position illustrated in FIG. 3A or in the lowered position illustrated in FIG. 3B by the apparatus 98. The pneumatic cylinders 112 are used to raise the elongate rubber members 104 and 106 from the lower position illustrated in solid lines in FIG. 3A to a maximum upper position illustrated by the broken lines in FIG. 3A so as to apply the appropriate pressure between the jaws which effect sealing between the webs of wrapping material WU and WL. Thus, the elongate rubber members 104 and 106 are not normally raised to the full limit of travel as illustrated by the dashed lines in FIG. 3A, but rather engage the elongate heated bars 94 and 96 at the location illustrated in FIG. 3B under the application of a predetermined force by the pneumatic cylinders 112 so that the jaws comprising the elongate heated bar 94 and the elongate rubber member 104, and the elongate heated bar 96 and the elongate rubber member 106, respectively, are engaged at the appropriate pressure to effect sealing between the webs of wrapping material WU and WL.

The subcarriage 110 has pneumatic cylinders 120 mounted thereon. An elongate heated severing blade 122 is mounted on a support 124 which is moved upwardly or downwardly under the action of the pneumatic cylinders 120. The elongate heated severing blade 122 is heated to a higher temperature than the operating temperatures of the elongate heated bars 94 and 96. Thus, upon engagement with the material comprising the webs of wrapping material WU and WL, the elongate heated severing blade 122 heats the material sufficiently to melt the material and thereby sever the webs WU and WL, thereby separating the leading package of bakery products from the trailing of package of bakery products.

In the operation of the apparatus for continuous bakery product wrapping 30, bakery products move through the carriage 44 under the action of the infeed conveyor 36 and the bakery product wrapping conveyor 38 while the component parts of the carriage 44 are in the open condition illustrated in FIG. 3A. Thereafter, the apparatus 98 of the upper portion 92 of the sealing and severing apparatus of the carriage 44 and the pneumatic cylinders 112 of the lower portion 102 of the sealing and severing mechanism are actuated to move the component parts of the sealing and severing mechanism to the closed condition as illustrated in FIG. 3B.

Due to the heating of the elongate heated bars 94 and 96, the bars 94 and 96 cooperate with the elongate rubber members 104 and 106 to define sealing jaws which effect transverse seals between the webs of bakery product wrapping material WU and WL at the trailing edge of the leading package of bakery products and at the leading edge of the trailing package of bakery products, respectively. During the process of forming seals at the trailing edge of the leading package of bakery products and at the leading edge of the trailing package of bakery products, the carriage 44 and therefore the jaws comprising the elongate heated bar 94 and the rubber member 104, and the jaws comprising the elongate heated bar 96 and the rubber member 106, respectively, move with the moving webs WU and WL along the path defined by the ways 70. Thus, the sealing operation takes place on a continuous basis with the bakery products being wrapped while moving continuously along the product path as defined by the arrows 32 and 34 without the necessity of stopping the movement of the bakery products to effect sealing of the bakery product packages.

The carriage 44 continues to move along the bakery product path after seals have been effected by the operation of the elongate heated bars 94 and 96 in cooperation with the elongate rubber members 104 and 106, respectively. The pneumatic cylinders 120 are next actuated to raise the elongate heated severing blade 122 into engagement with the portion of the webs WU and WL extending between the previously formed seals at the trailing edge of the leading package of bakery products and at the leading edge of the trailing package of bakery products, thereby severing the webs WU and WL and separating the adjacent packages of bakery products. The carriage 44 is then returned to the position shown in full lines in FIG. 1 while separated packages continue to move along the bakery product path under the action of the wrapping conveyor 38 and the discharge conveyor 40.

The apparatus 98 for raising and lowering the elongate heated bars 94 and 96 of the upper portion 92 of the heating and severing mechanism of the carriage 44 is further illustrated in FIGS. 4A and 4B. The carriage 44 includes upwardly extending members 130 positioned at the opposite sides of the course of the product wrapping conveyor 38 and having identical racks 132 mounted thereon. A pair of identical pinions 134 are rotatably supported at the opposite ends of a bar 136 and are mounted in meshing engagement with the racks 132. The pinions 134 are supported by shafts 138 which are mounted in bushings 140 mounted in the bar 136.

Each shaft 138 extends outwardly from one side of the bar 136 and has a sprocket 142 mounted thereon. A timing belt 144 extends around each sprocket 142, around a drive sprocket 146 and around an idler sprocket 148. A pair of pneumatic actuators 150 are mounted on a post 152 extending upwardly from the bar 136. Pneumatic actuators 150 are selectively actuated to effect rotation of identical sprockets 146 mounted on the opposite sides of the post 152 and supported by a drive shaft 154. Thus, upon actuation thereof, the pneumatic actuators 150 effect rotation of the sprockets 146 which operate through the timing belts 144 and the sprockets 142 to effect equal and opposite rotation of the pinions 134. Since the pinions 134 are mounted in mesh with the racks 132, actuation of the pneumatic actuators 150 thus controls the vertical positioning of the elongate heated bars 94 and 96 of the upper portion 92 of the sealing and severing mechanism of the carriage 44.

Figure 5:
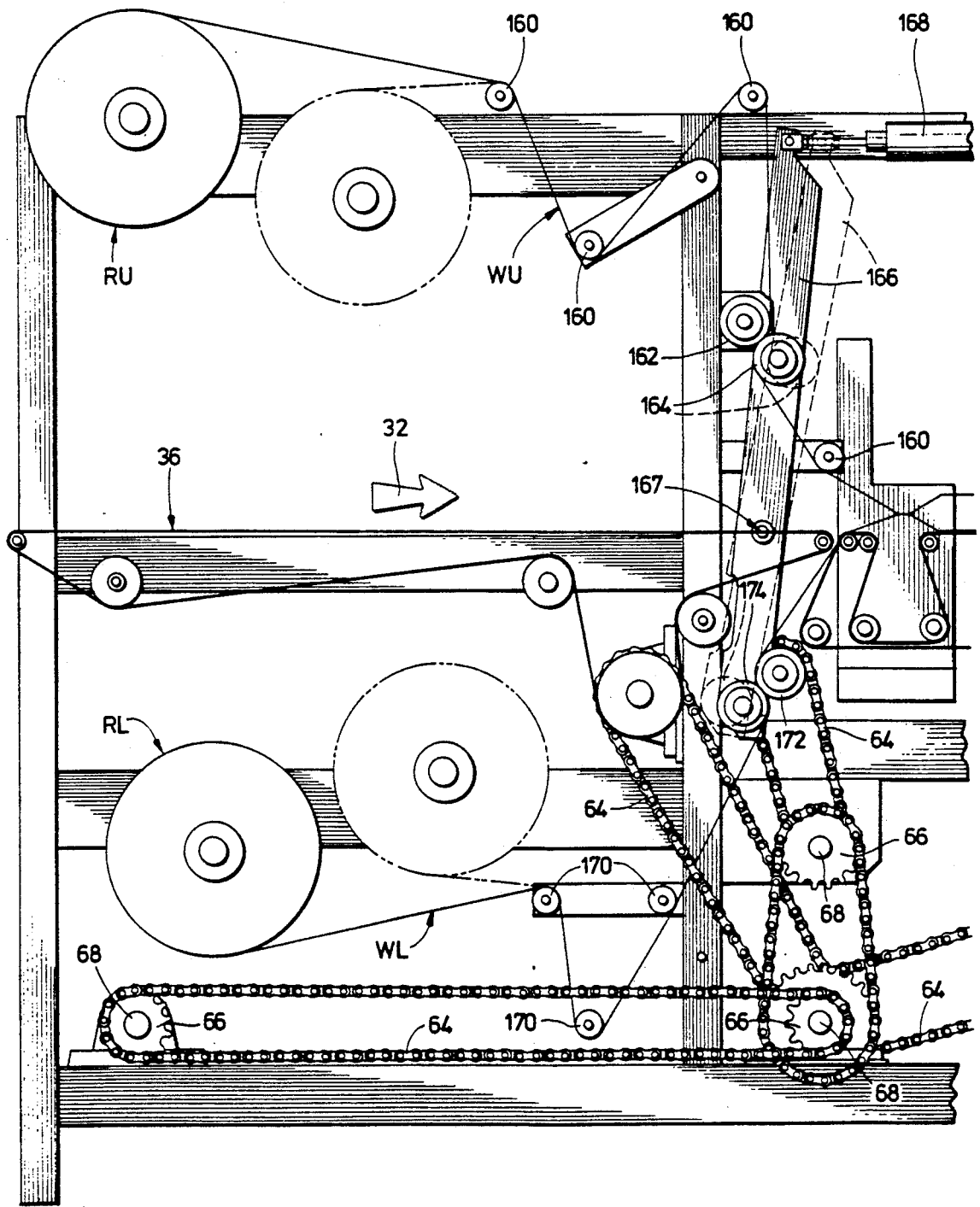
FIG. 5 is a partial side view of the apparatus of FIG. 1 further illustrating the infeed conveyor thereof.

Referring now to FIGS. 5, 6 and 7, the infeed end of the apparatus for continuous bakery product wrapping 30 is illustrated in greater detail. The upper and lower webs of bakery product wrapping material WU and WL, respectively, are supplied from upper and lower rolls RU and RL, respectively. Spare or backup rolls of bakery product wrapping material are mounted adjacent to the rolls RU and RL so as to facilitate rapid changeover from a spent roll to a fresh roll, thereby eliminating downtime. The web of bakery product wrapping WU extends from the roll RU along a course defined by a series of rollers 160. The course of the web WU extends over a drive roller 162 mounted on the frame 50 of the apparatus 30 and ultimately driven by the motor 54. A pinch roller 164 is mounted on a bar 166 which is selectively pivoted about an axis 167 by a pneumatic cylinder 168. Thus, upon actuation of the pneumatic cylinder 168, the pinch roller 164 engages the drive roller 162 with the web WU trapped therebetween, thereby advancing the web WU along the course defined by the idler rollers 160.

Likewise, the web of bakery product wrapping material WL extends from the roll RL along a course defined by a series of idler rollers 170. The course of the web WL includes a drive roller 172 mounted on the frame 50 of the apparatus 30 normally driven by the drive motor 54. A pinch roller 174 is mounted on the bar 166 and is selectively engaged with the drive roller 172 under the action of the pneumatic cylinder 168.

Thus, upon actuation of the pneumatic cylinder the pinch roller 174 is engaged with the drive roller 172 with the web WL trapped therebetween, whereupon the drive roller 172 operates to advance the web WL from the roll RL along the course defined by the idler rollers 170.

The bakery products are received on the infeed conveyor 36 which comprises part of the bakery product path of the apparatus 30 from a discharge conveyor of a bakery product slicer. The bakery products are typically received on the infeed conveyor 36 in an expanded condition, that is, the bakery products are comprised of a series of longitudinally extending rows with spacing provided between adjacent rows. As will be appreciated by those skilled in the art, bakery products are typically not packaged in such expanded condition, but rather are crowded together as much as possible without damaging the bakery products in order to effect efficient packaging thereof.

Referring specifically to FIGS. 6 and 7, the infeed conveyor 36 includes a belt 180 which extends under a pair of guides 182 which function to gather or crowd bakery products received on the infeed conveyor 36 into a spacing arrangement appropriate for packaging. Each of the guides 182 includes a belt 184 mounted for movement around a course defined by a drive roller 186 and a plurality of idler rollers 188. The drive rollers 186 and therefore the belts 184 are driven by drive shafts 190 which are in turn ultimately driven by the motor 54.

The guides 182 are selectively positionable by a lead screw 192. The lead screw 192 is insertedly engaged with members 194 mounted on the guides 182, thereby selectively pivoting the guides 182 about the axes of the drive shafts 190. The lead screw 192 is actuated by a hand wheel 196. The limits of pivotal movement of the guides 182 are illustrated in full lines and in broken lines, respectively, in FIG. 6.

Figure 8:
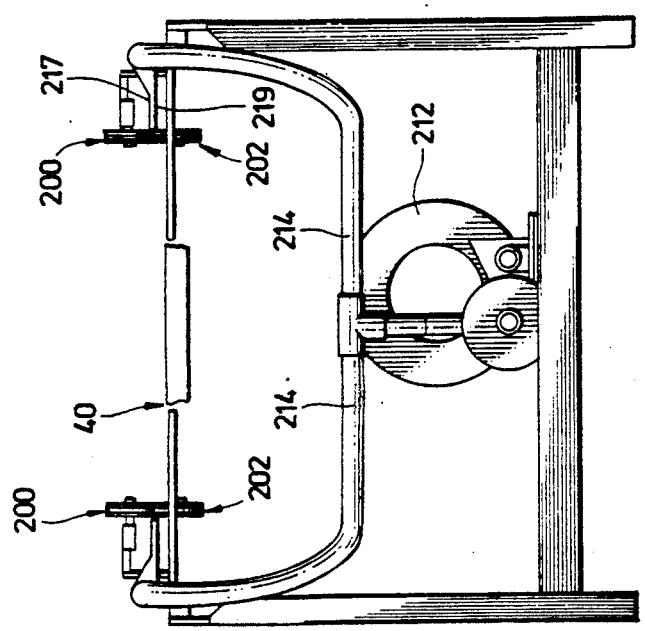
FIG. 8 is a partial end view of the discharge end of the apparatus of FIG. 1 illustrating the mechanism for partially evacuating and sealing the lateral edges of bakery product packages formed thereby.

The discharge end of the apparatus for continuous bakery product wrapping is illustrated in FIGS. 8, 9, 10, 11, 12 and 13. Referring particularly to FIGS. 8, 10 and 11, an upper lateral sealing roller 200 and a cooperating lower lateral sealing roller 202 are provided on each side of the course of the discharge conveyor 40. Referring particularly to FIGS. 10 and 11, the rollers 200 and 202 comprise spaced apart flanges 204 defining a gap 206 therebetween. As specially in FIG. 10, discharge nozzles 208 extend into the gaps 206. The nozzles 208 each extend from a source of heated air 210. In the operation of the lateral sealing mechanism at each side of the course of the discharge conveyor 40, the nozzles 208 direct heated air into engagement with the bakery product wrapping material extending above and below the bakery products being wrapped and previously sealed at the leading and trailing edges thereof. The heated air discharged from the nozzles 208 melts the bakery product wrapping material sufficiently so that the cooperating flanges 204 of the rollers 202 can form a seal between the two webs of bakery product wrapping material, thereby sealing the lateral edges of the bakery product packages.

Figure 9:
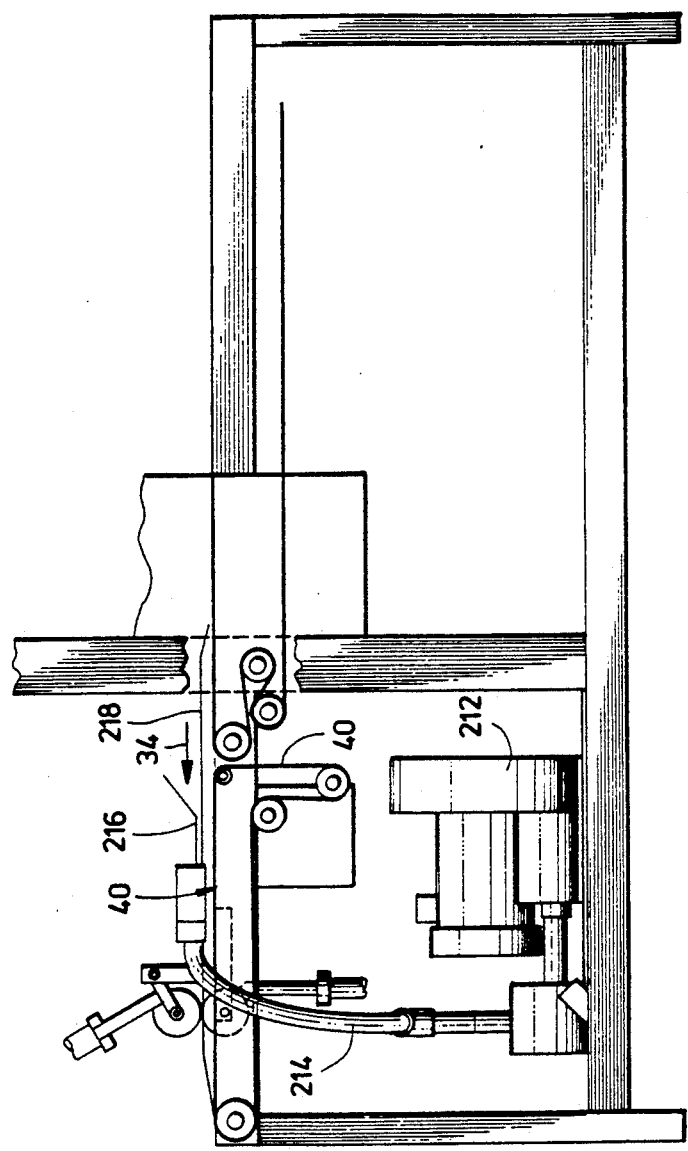
FIG. 9 is a partial side view of the discharge end of the apparatus of FIG. 1.

As is best shown in FIGS. 8 and 9, the apparatus for continuous bakery product wrapping 30 includes a blower 212 which functions to form a partial vacuum in a pair of vacuum tubes 214. The length of bakery product wrapping material situated on top of the bakery products being wrapped is guided between a plate 216 (FIG. 9) and a plate 217. Likewise, the length of bakery product wrapping material situated beneath the bakery products being wrapped is guided between a plate 218 and a plate 219. The vacuum tubes 214 establish a partial vacuum between the plates 217 and 219, thereby withdrawing air from the package of bakery products just prior to the forming of the lateral seals of the package by the rollers 200 and 202. The apparatus shown in FIGS. 8 and 9 is not intended to "vacuum pack" the bakery products within the packaging formed by the apparatus 30. Rather, the apparatus of FIGS. 8 and 9 forms a reduced pressure condition within the package formed by the apparatus 30, thereby causing the bakery product wrapping material which surrounds the bakery products to hug the bakery products tightly and prevent movement thereof during shipping. This assures that the bakery products will be received by the ultimate customer in an as near perfect condition as possible.

As is best shown in FIGS. 12 and 13, the rollers 200 and 202 which form the lateral seals of the bakery product packages formed by the apparatus 30 are mounted on guides 220. A lead screw 222 extends adjacent and parallel to the guide 220 and is actuated by hand wheel 224. The opposite ends of the lead screw 222 have right-hand and left-hand threads, respectively. Members 226 are mounted in threaded engagement with the lead screw 222 and are connected to the support structure for the rollers 200 and 202. Thus, upon actuation of the hand wheel 224, the rollers 200 and 202 can be positioned appropriately for the size of the bakery product package being sealed thereby.

The discharge conveyor 40 of the apparatus 30 comprising a plurality of spaced apart belts 228. The belts 228 travel around a course including a lower portion which extends through guides 230. The positioning of the guides 230 is controlled by a pantograph linkage 232 which is actuated by the lead screw 222 under the operation of the hand wheel 224.

The pantograph linkage 232 comprises equal and opposite halves situated on opposite sides of the centerline of the discharge conveyor 40. The inboard end 234 of each half of the pantograph linkage 232 is fixed, while the outboard end thereof 236 is secured to the member 226 which is threadedly engaged with the lead screw 222. Thus, upon actuation of the lead screw 222, the outboard ends of the pantographic mechanism 232 are moved either inwardly or outwardly depending on the size of the bakery package being conveyed. This in turn locates the belts 228 comprising the discharge conveyor 40 in accordance with package size. The limits of travel of the pantograph linkage 232 and therefore the limits of the positioning of the belts 228 comprising the discharge conveyor 40 are illustrated on the left-hand side and the right-hand side of FIGS. 12 and 13.

FIGS. 14, 15, 16 and 17 illustrate a mechanism which can be selectively utilized in conjunction with the apparatus for continuous bakery product wrapping 30 to form a longitudinally extending center seal for the bakery product packages thus formed. By way of example, in the case of a bakery product package enclosing twelve hamburger buns, it may be desirable to form a center seal so that six of the hamburger buns remain sealed during usage of the buns comprising the first half of the package to be opened.

The mechanism for forming a center seal in a bakery product package includes a lower sealing apparatus 240 shown in FIGS. 14 and 15 and an upper sealing apparatus 242 shown in FIGS. 16 and 17. The lower sealing apparatus 240 comprises a roller 244 comprising a pair of spaced apart flanges 246 defining a groove 248 therebetween. A nozzle 250 extends from a source of heated air 252 into the groove 248 extending between the flanges 246 of the roller 244.

Upon actuation of a pneumatic cylinder 254, the roller 244 engages the length of bakery product wrapping material extending beneath the wrapped bakery products. Heated air from the source 252 is directed through the nozzle 250 and functions to partially melt the bakery product wrapping material. The partially melted bakery product wrapping material is forced upwardly by operation of the roller 244.

Referring to FIGS. 16 and 17, the upper sealing mechanism 242 includes a roller 264 positioned for selective engagement with the length of bakery product wrapping material extending above the wrapped bakery products. The roller 264 comprises a pair of spaced apart flanges 266 defining a groove 268 therebetween. A nozzle 270 extends into the groove 268 and functions to direct heated air into the groove from a source 272. The heated air functions to sufficiently soften the bakery product wrapping material so that the roller 264 can effect a seal with the corresponding lengths of bakery product wrapping material extending beneath the bakery products.

The roller 264 is selectively positioned in engagement with the length of bakery product wrapping material extending above the wrapped bakery products by a cylinder 274. The roller 244 of the mechanism 240 is preferably positioned directly beneath and in alignment with the roller 264 of the mechanism 242. Likewise, the cylinders 254 and 274 are preferably actuated in tandem. Thus, upon actuation of the cylinders 274 and 254, the upper and lower lengths of bakery product wrapping material are pinched between the rollers 264 and 244, so that upon the application of heated air discharged through the nozzles 270 and 250, the bakery product wrapping material is softened and a seal is formed therebetween.

Figure 18:
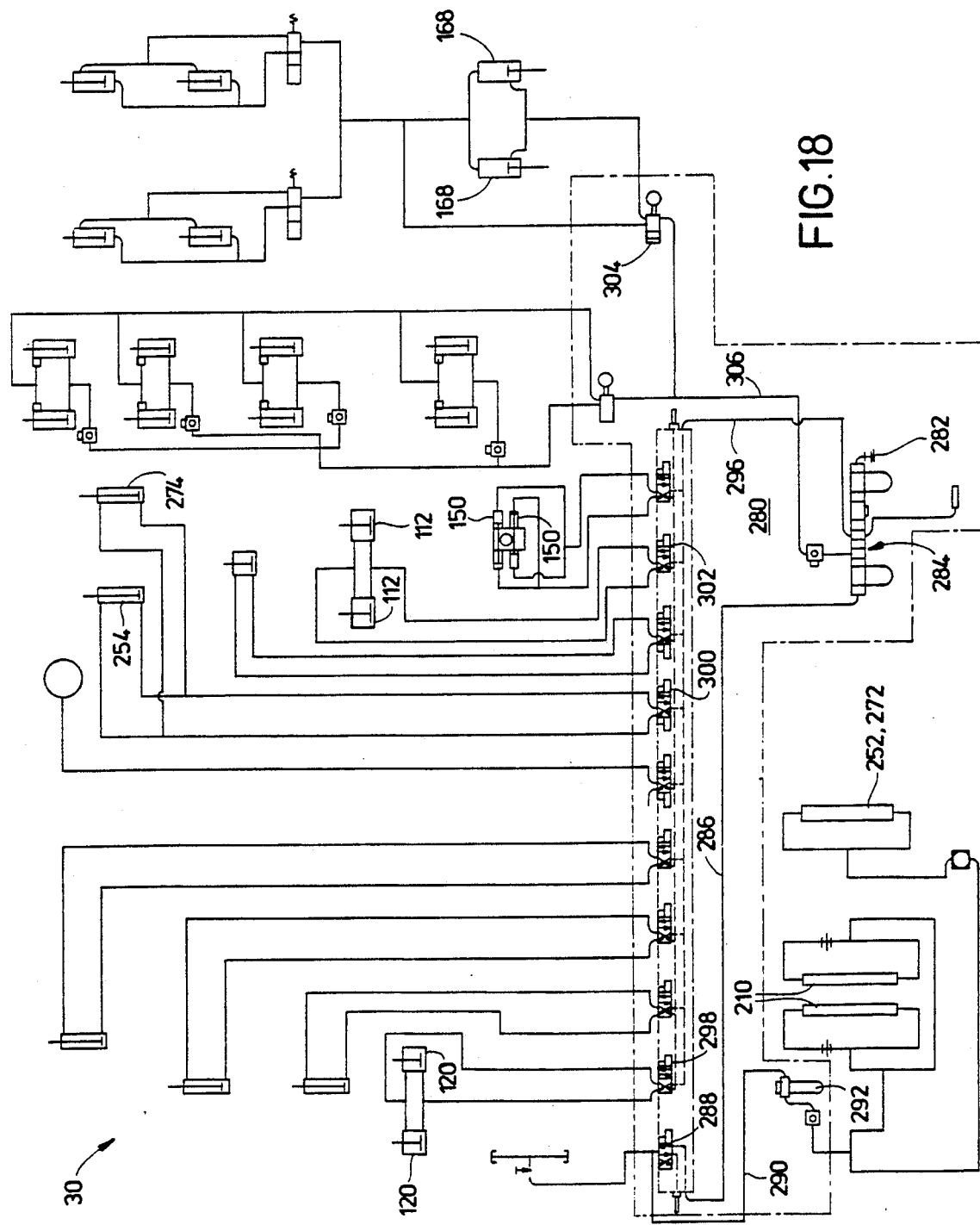
FIG. 18 is a diagrammatic illustration of the pneumatic circuitry of the apparatus of FIG. 1.

Referring now to FIG. 18, the apparatus for continuous bakery product wrapping 30 includes a pneumatic circuit 280. Compressed air is received into the pneumatic circuit 280 through an inlet port 282 and is directed through a manifold 284 to a line 286 extending to two-position three-way valve 288 adapted for solenoid actuation and spring return. From the valve 288 the compressed air is directed through a line 290 and hence to the sources of heated air 210 which supply heated air to the lateral sealing rollers 200 and 202 illustrated in FIGS. 10 and 11 and to the sources of compressed air 252 and 272 which supply heated air to the center sealing rollers 244 and 264 illustrated in FIGS. 14, 15, 16 and 17. The air entering the sources of heated air which serve the sealing apparatus is directed through a filter 292 so that the bakery product packages formed by the lateral sealing mechanisms and the center sealing mechanisms is not contaminated.

Compressed air from the manifold 284 is also directed through a line 296 to a valve 298. The valve 298 comprises a two-position four-way valve adapted for solenoid actuation and spring return. The valve 298 functions to direct compressed air to the pneumatic cylinders 120 on the subcarriage 110 which effect positioning of the elongate heated severing blade 122.

In a like manner, compressed air for actuating the pneumatic cylinders 254 and 274 of the center sealing mechanism shown in FIGS. 14, 15, 16, and 17 is directed to the cylinders 254 and 274 from the line 296 through a two-position four-way valve 300 adapted for solenoid actuation and solenoid return. Compressed air for actuating the pneumatic cylinder 112 which controls the positioning of the subcarriage 110 on the carriage 44 is directed to the pneumatic cylinder 112 through a two-position four-way valve 302 adapted for solenoid actuation and solenoid return. A two-position four-way valve 304 adapted for solenoid actuation and spring return directs compressed air from the line 296 to the pneumatic actuators 150 which control the positioning of the elongate heated bars 94 and 96. A two-position four-way valve 304 controls the flow of compressed air from a manifold 284 through a line 306 to the cylinders 168 which control the positioning of the pinch rollers that in turn regulate the advance of the webs of bakery product wrapping material WU and WL.

Referring now to FIGS. 19A, 19B and 20, there is shown a pantographic linkage 310 which may be used to control the positioning of bakery product guides which in turn control the positioning of bakery products entering a bakery product slicing machine. The pantographic linkage 310 includes a plurality of block 314 each having a guide receiving aperture 316 formed therein. The bakery product guides 312 are selectively positioned in the aperture 316, it being understood that in some instances all of the apertures 316 receive a bakery product guide, whereas in other instances, a bakery product guide 312 is positioned in alternative apertures 316, depending on product size.

The pantographic linkage 310 comprises equal and opposite halves extending in opposite directions from a fixed center block 318. The blocks 314 are slidably supported and the positioning thereof is controlled by the pantographic linkage 310. The linkage 310 further comprises an outboard block 320 which is threaded engaged with a lead screw 322. The lead screw is drivingly connected to a sprocket which is driven by a chain 326. Thus, upon the application of a suitable input to the chain 326, the outboard block 320 and therefore the blocks 314 are selectively positioned relative to the fixed block 318. The limits of travel of the pantographic linkage 310 are illustrated in FIGS. 19A and 19B, respectively.

Although preferred embodiments of the invention have been illustrated in the accompanying Drawings and described in the foregoing Detailed Description, it will be understood that the invention is not limited to the embodiments disclosed but is capable of numerous rearrangements and modifications of parts and elements without departing from the spirit of the invention.

We claim:

1. An apparatus for continuous wrapping of bakery products with simultaneous sealing of the wrapping material into product packages as the bakery products continue uninterrupted progression along a bakery product path through the product line, comprising:

means for feeding upper and lower lengths of wrapping material along the bakery product path;

means for conveying the bakery product groups between the upper and lower lengths of wrapping material;

jaws for sealing the wrapping material to effect transverse seals along the trailing edge of a first bakery product group and along the leading edge of a second bakery product group;

means for heating the jaws to effect the transverse seals;

means for moving the jaws along the bakery product path while effecting the transverse seals;

means for opening the jaws to release the wrapping material after the predetermined time required for effecting the transverse seals;

means for retracting the open jaws along the bakery product path to the point of beginning;

means for activating the jaws to effect the transverse seals of the trailing and leading edges of the next following bakery product groups;

means for removing the excess air from the bakery product packages having transverse seals; and means for sealing the lateral edges of the bakery product packages after the excess air has been removed.

2. The apparatus for continuous wrapping of bakery products as described in claim 1 wherein the conveyor means comprises:

a continuous infeed conveyor chain for receiving bakery product groups from the product line and over which the bakery product groups travel as space is reduced in the product groups;

a continuous conveyor belt for receiving the bakery product groups from the input conveyor chain for uninterrupted movement along the bakery product path where transverse sealing of product packages is effected;

continuous adjustably spaced, parallel discharge conveyor belts for receiving bakery product packages from the continuous conveyor belt for continued movement of the product packages along the bakery product path where lateral and longitudinal sealing of the packages are effected; and means for adjusting the space between the parallel discharge conveyor belts.

3. The apparatus for continuous wrapping of bakery products as described in claim 2, wherein the means for lateral sealing of the product packages comprises:

a first pair of sealing wheels mounted on opposed sides of the frame in a vertical orientation parallel to the side of the frame and above the surface of the frame over which the discharge conveyor belts travel;

a second pair of sealing wheels mounted on opposed sides of the frame in a vertical orientation directly below and abutting the first pair of sealing wheels for engaging and moving the lateral edges of the wrapping material of the product packages between the first and second pairs of sealing wheels;

means for directing hot air between the first and second pairs of sealing wheel to effect a seal in the wrapping material traveling between the first and second pairs of sealing wheels; and means for heating the air directed between the first and second pairs of wheels.

4. The apparatus for continuous wrapping of bakery products as described in claim 1, further comprising means for heating the upper portion of the jaws to effect a transverse seal of the wrapping material.

5. The apparatus for continuous wrapping of bakery products as described in claim 2, wherein the means for longitudinal sealing of the product packages comprises:

a first center sealing wheel mounted to the frame in a vertical orientation at a point midway between opposed sides of the frame and above the surface of the frame over which the discharge conveyor belts travel;

a second center sealing wheel mounted to the frame in a vertical orientation directly below and abutting the first center sealing wheel for engaging the product package between the first and second center sealing wheels;

means for directing hot air between the first and second center sealing wheels to effect a seal in the wrapping material of the product package traveling between the first and second center sealing wheels; and means for heating the air directed between the first and second center sealing wheels.

6. The apparatus for continuously wrapping bakery products as described in claim 2 further comprising guide means for reducing the spacing between the bakery products received at the infeed end of the conveyor means.

7. The apparatus for continuous wrapping of bakery products as described in claim 2, wherein means for adjusting the space between the parallel discharge conveyor belts includes an adjustable guide pantograph.

8. A selectively positionable bakery product guide mechanism comprising:

a spaced array of blocks each having a bakery product guide receiving apparatus formed therein;

a plurality of bakery product guides each selectively engagable with the bakery product guide receiving aperture of one of the block;

the array of blocks including a fixedly located block at one end thereof;

the array of blocks further comprising a block at the opposite end thereof from the fixedly located block adapted for threaded engagement with a lead screw;

a lead screw threaded engaged with the block of the array located at the opposite end thereof from the fixed located block and selectively operable to position the block of the array threaded engaged therewith; and a pantograph linkage connected between each of the blocks comprising the array whereupon movement of the block engaged with the lead screw operates through the pantographic linkage to control the positioning of all of the blocks of the array and thereby control the positioning of the bakery product guides engaged therewith.

9. A method for continuous wrapping of bakery products with simultaneous sealing of the wrapping material into product packages as the bakery products continue uninterrupted progression along a bakery product path at a predetermined rate, comprising steps for:

feeding upper and lower lengths of wrapping material along the bakery product path;

conveying the bakery product groups between the upper and lower lengths of wrapping material;

providing jaws for sealing the wrapping material to effect transverse seals along the trailing edge of a first bakery product group and along the leading edge of a second bakery product group;

heating the jaws to effect the transverse seals;

moving the jaws along the bakery product path while effecting the transverse seals;

opening the jaws to release the wrapping material after the predetermined time required for effecting the transverse seals;

retracting the open jaws along the bakery product path to the point of beginning;

activating the jaws to effect the transverse seals of the trailing and leading edges of the next following bakery product groups;

removing the excess air from the bakery product packages having transverse seals; and sealing the lateral edges of the bakery product packages after the excess air has been removed.

10. The method for continuously wrapping bakery products as described in claim 9, further comprising the step of cutting the wrapping material between the transverse seals to separate the bakery product packages.

11. The method for continuously wrapping bakery products as described in claim 9, further comprising the step of longitudinally sealing the product packages.

12. The method for continuously wrapping bakery products as described in claim 11, further comprising the step of cutting the wrapping material along the longitudinal seal.

13. The method for continuously wrapping bakery products as described in claim 9, further comprising the step of controlling the length of the path of movement of the jaws along the bakery product path relative to the time required for effecting a seal of the wrapping material.

14. A method for continuous wrapping of bakery products with simultaneous sealing of the wrapping material into product packages as the bakery products continue uninterrupted progression along a bakery product path through the product line, comprising steps for:

reducing space between bakery products grouped into predetermined numbers;

feeding upper and lower lengths of wrapping material along the bakery product path;

conveying the bakery product groups between the upper and lower lengths of wrapping material;

providing jaws for sealing the wrapping material to effect transverse seals along the trailing edge of a first bakery product group and along the leading edge of a second bakery product group;

heating the jaws to effect the transverse seals;

moving the jaws along the bakery product path while effecting the transverse seals;

opening the jaws to release the wrapping material after the predetermined time required for effecting the transverse seals;

retracting the open jaws along the bakery product path to the point of beginning;

activating the jaws to effect the transverse seals of the trailing and leading edges of the next following bakery product groups;

removing the excess air from the bakery product packages having transverse seals; and sealing the lateral edges of the bakery product packages after the excess air has been removed.

15. The method for continuously wrapping bakery products as described in claim 14, further comprising the step of cutting the wrapping material between the transverse seals to separate the bakery product packages.

16. The method for continuously wrapping bakery products as described in claim 14, further comprising the step of controlling the length of the path of movement of the jaws along the bakery product path relative to the time required for effecting a seal of the wrapping material.

17. The method for continuously wrapping bakery products as described in claim 13, further comprising the step of longitudinally sealing the product packages.

18. The method for continuously wrapping bakery products as described in claim 17, further comprising the step of cutting the wrapping material along the longitudinal seal.

19. In an automated commercial bakery wherein the bakery products travel along a bakery product path at a predetermined rate, apparatus for continuously wrapping the bakery products with simultaneous sealing of the wrapping material into product packages as the bakery products continue uninterrupted progression along the bakery product path comprising:

conveyor means having an infeed end for receiving the bakery products, for moving the bakery products along the bakery product path for wrapping, and having a discharge end for discharging the wrapped bakery product;

a frame for supporting the conveyor means;

means for directing upper and lower lengths of wrapping material along the bakery product path;

opposed jaws for receiving the length of wrapping material and the bakery products to be wrapped therebetween and for simultaneously forming transverse seals at the trailing edge of a first package of bakery products and at the leading edge of a second package of bakery products;

cutting means disposed between the jaws to separate the bakery product packages between the transverse seals;

a carriage for supporting the jaws for movement along the bakery product path at the predetermined rate as the transverse seals are formed;

ways supporting the carriage for movement of the jaws along the bakery product path as the transverse seals are formed;

vacuum means mounted to the frame at the discharge end of the conveyor means for removal of excess air from the product packages after the transverse seals have been formed; and means for simultaneously sealing the lateral edges of the product packages as the excess air is removed from the product packages.

20. The apparatus for continuous wrapping of bakery products as described in claim 19, further comprising means for longitudinal sealing of the center of the bakery product packages simultaneously with the sealing of the lateral edges of the product packages.

21. The apparatus for continuous wrapping of bakery products as described in claim 20, further comprising means for cutting the wrapping material along the longitudinal seal.

22. The apparatus for continuous wrapping of bakery products as described in claim 19, further comprising adjustable guide means mounted on the frame above the infeed end of the conveyor means for reducing space between bakery products grouped into predetermined numbers.

23. The apparatus for continuously wrapping bakery products as described in claim 19, wherein the conveyor means comprises:

a continuous infeed conveyor for receiving bakery products and over which the bakery products travel as space is reduced between the bakery products;

a continuous conveyor belt for receiving the bakery products from the input conveyor for uninterrupted movement along the bakery product path where transverse sealing of product packages is effected;

continuous, adjustably spaced, parallel discharge conveyor belts for receiving bakery product packages from the continuous conveyor belt for continued movement of the product packages along the bakery product path while lateral sealing of the packages is effected; and means for adjusting the space between the parallel discharge conveyor belts.

24. The apparatus for continuous wrapping of bakery products as described in claim 23, wherein the means for adjusting the spaced between the parallel discharge conveyor belts includes an adjustable guide pantograph.

25. The apparatus for continuously wrapping bakery products as described in claim 23, wherein the means for lateral sealing of the product packages comprises:

a first pair of sealing wheels mounted on opposed sides of the bakery product path vertical orientations above the discharge conveyor belts;

a second pair of sealing wheels mounted on opposed sides of the bakery product path in a vertical orientations directly below and abutting the first pair of sealing wheels for engaging and moving the lateral edges of the wrapping material of the product packages between the first and second pairs of sealing wheels; and means for directing hot air between the first and second pairs of sealing wheels to effect a seal in the wrapping material traveling between the first and second pairs of sealing wheels.

26. The apparatus for continuously wrapping bakery products as described in claim 23, further including means for longitudinal sealing of the product packages comprising:

a first center sealing wheel mounted in a vertical orientation at a centrally disposed location relative to the bakery product path;

a second center sealing wheel mounted directly below and abutting the first center sealing wheel for engaging the product package between the first and second center sealing wheels; and means for directing hot air between the first and second center sealing wheels to effect a seal in the wrapping material of the product packages traveling between the first and second center sealing wheels.

27. The apparatus for continuously wrapping bakery products as described in claim 19, further comprising means for opening the jaws to receive bakery products therebetween and for closing the jaws into engagement with the wrapping material to form the transverse seals.

28. The apparatus for continuously wrapping bakery products as described in claim 19, further comprising means for heating the jaws to effect the transverse seals of the wrapping material.

29. The apparatus for continuously wrapping bakery products as described in claim 19, further comprising means for controlling the distance the carriage means travels along the bakery product path in accordance with the time required to effect the simultaneous transverse seals of the wrapping material.

* * * * *